(12) United States Patent
Lo

(10) Patent No.: US 7,697,763 B2
(45) Date of Patent: Apr. 13, 2010

(54) DATA COMPRESSION METHOD AND APPARATUS THEREOF

(75) Inventor: Jui-Lin Lo, Tainan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 858 days.

(21) Appl. No.: 11/533,375

(22) Filed: Sep. 20, 2006

(65) Prior Publication Data

US 2007/0269116 A1    Nov. 22, 2007

(30) Foreign Application Priority Data

May 17, 2006  (TW) .............................. 95117421 A

(51) Int. Cl.
*G06K 9/62* (2006.01)

(52) U.S. Cl. ................... 382/224; 382/232; 382/233

(58) Field of Classification Search .......... 382/232, 382/233, 238, 239, 266, 300, 305, 164, 224, 382/253, 291; 358/426.02, 1.9; 345/545, 345/556; 707/10, 104.1; 235/492; 704/233, 704/231; 348/384.1, 423.1; 725/38

See application file for complete search history.

(56) References Cited

U.S. PATENT DOCUMENTS

| | | | | |
|---|---|---|---|---|
| 5,805,745 A | * | 9/1998 | Graf | 382/291 |
| 6,438,268 B1 | * | 8/2002 | Cockshott et al. | 382/253 |
| 6,754,905 B2 | * | 6/2004 | Gordon et al. | 725/38 |

* cited by examiner

*Primary Examiner*—Anh Hong Do
(74) *Attorney, Agent, or Firm*—Jianq Chyun IP Office

(57) ABSTRACT

A Block Truncation Coding (BTC) method and apparatus thereof are provided, which can avoid the flickers of pixels when applied to moving picture sequence, or increase the quantization levels with a simple and low-cost method. The BTC method includes: (a) receiving an image input of a block containing a plurality of pixels, and calculating the block mean in the pixels X; (b) classifying the pixels into a high intensity group and a low intensity group based on the mean value of the pixels, and assigning a corresponding bit based on which group each of the pixels belongs to, the corresponding bits of all the pixels constituting a bitmap, wherein the pixels or the corresponding bits are stabilized; and (c) calculating the mean value of the pixels of the high intensity group A and the mean value of the pixels of the low intensity group B.

32 Claims, 3 Drawing Sheets

DATA COMPRESSION METHOD AND APPARATUS THEREOF

CROSS-REFERENCE TO RELATED APPLICATION

This application claims the priority benefit of Taiwan application serial no. 95117421, filed May 17, 2006. All disclosure of the Taiwan application is incorporated herein by reference.

BACKGROUND OF THE INVENTION

1. Field of Invention

The present invention relates to a method of image coding and decoding, and more particularly, to a Block Truncation Coding (BTC) method and apparatus thereof.

2. Description of Related Art

The amount of data in the digital video image transmission is usually very large, so image compression or source coding is one of the most important steps in the digital video image processing. The common image compression or source coding methods include the JPEG coding method for static images, the Motion Picture Experts Group (MPEG) coding method for motion picture compression, etc. However, when performing the digital image coding, the compression methods require huge memory size and high-speed and complicated digital processing capability; thus, it is usually impractical to be used in some integrated circuits that can perform only simple operation. Here, the BTC (Block Truncation Coding) is an appropriate method.

The conventional BTC method comprises the following steps:
(a) Divide the whole image into blocks that are mutually non-overlapped and each block comprises M×N pixels (horizontal M points and vertical N points);
(b) Calculate the block mean X of the pixels in each block;
(c) According to the block mean X, classify the pixels in the block into a high intensity group whose pixel values are larger than or equal to the block mean X, and a low intensity group whose pixel values are less than the block mean X;
(d) Assign a corresponding bit based on which group each of the pixels belongs to, for example, the bit 1 represents that the pixel belongs to the high intensity group, and the bit 0 represents that the pixel belongs to the low intensity group, the number of the corresponding bits of all the pixels is M×N, and the corresponding bits of all the pixels constitutes a bitmap;
(e) Calculate the mean value of the pixels of the high intensity group A called high mean and the mean value of the pixels of the low intensity group B called low mean;
(f) Transmit the high mean A, the low mean B and the bitmap for decoding; and
(g) Repeat steps (a) to (f) for the coming blocks of the source image;

The Block Truncation Decoding method comprises:
(a) Receive the high mean A, the low mean B and bitmap of a particular block in the source image;
(b) If the corresponding bit of the pixel in the bitmap is 1, use the high mean A as the decoding value, otherwise, use the low mean B as the decoding value; and
(c) Repeat the same operation on the other blocks in the source image.

In the following, a specific embodiment is used for description. Referring to the table below, it is assumed that the input image is divided into the blocks formed by 4×2 pixels, and one of the blocks is as follows:

TABLE 1

| 101 | 98 | 99 | 46 |
|-----|-----|-----|-----|
| 102 | 50 | 48 | 48 |

In the following, the above block is coded as an example. The block mean X in the block is 74. The pixels that are larger than or equal to 74 belong to the high intensity group, and the pixels that are less than 74 belong to the low intensity group, and the bitmap is:

| 1 | 1 | 1 | 0 |
|---|---|---|---|
| 1 | 0 | 0 | 0 | this can be coded as C8H (hexadecimal). The mean value of the high intensity group (high mean) A is 100, and the mean value of the low intensity group (low mean) B is 48. The high mean 100, the low mean 48 and the bitmap (C8H) are transmitted for decoding.

During decoding, the decoder receives A: the high mean 100; B: the low mean 48 and the bitmap (C8H), and the block after decoding is:

| 100 | 100 | 100 | 48 |
|-----|-----|-----|-----|
| 100 | 48 | 48 | 48 |

When the conventional BTC method is applied to a moving picture sequence, sometimes a pixel at the same position in a frame may be affected by the noise so that the pixel is classified into the high intensity group in a certain frame, and classified into the low intensity group in another frame. This unstable assignment also results in significant change in the high and low means. During decoding, the high mean and low mean may be respectively used as the decoding value. If the difference between the two mean values is big, the pixel may have flickers at different frames, which seriously influences the quality of the frame.

Moreover, in the conventional BTC method, because only the two high and low mean values are used to decode the block, the quality of the decoded image of the highly changing block is not sufficient. The present invention aims to minimize the above two disadvantages with simple modification on the block truncation coding.

SUMMARY OF THE INVENTION

Accordingly, the present invention provides a BTC method, in which a stabilizing operation for the pixel or the corresponding bitmap is added in the conventional BTC method, thus avoiding unpleasant flickers when an image sequence is input.

The present invention provides a BTC method, which improves the conventional two-level BTC method to the four-level BTC with the minimum requirement for operation or circuits and by slightly increasing the bit-rate for transmission. The improvement can effectively enhance the quality of the frame, and is also suitable for implementation in an integrated circuit.

The present invention provides a BTC apparatus, which a stabilizing operation for the pixel or the corresponding bitmap is added, thus avoiding unpleasant flickers.

The present invention provides a BTC apparatus, which improves the conventional two-level BTC apparatus to the four-level BTC apparatus, so as to effectively enhance the quality of the frame.

The present invention provides a BTC method, which comprises: (a) receiving an image input of a block comprising a plurality of pixels, and calculating a mean value of the pixels X; (b) classifying the pixels into a high intensity group and a low intensity group based on the mean value of the pixels, and assigning a corresponding bit based on which group each of the pixels belongs to, the corresponding bits of all the pixels constituting a bitmap, wherein the pixels or the corresponding bits are stabilized; and (c) calculating the mean value of the pixels of the high intensity group: the high mean A, and the mean value of the pixels of the low intensity group: the low mean B.

In the BTC method according to an embodiment of the present invention, the step (b) comprises: filtering the pixels in horizontal direction, or in the vertical direction or between different frames; and assigning the corresponding bits based on the filtered result. Or, in the BTC method according to another embodiment of the present invention, the step (b) comprises: assigning the corresponding bits for the current frame with reference to the high mean A, the low mean B and the bitmap value for a plurality of frames before and after the current frame. Or, in the BTC method according to still another embodiment of the present invention, the step (b) comprises: adding predetermined amplitude to the block mean X to serve as a new quantization threshold, and classifying the high intensity group and the low intensity group based on the new quantization threshold. Moreover, the BTC method according to the embodiment of the present invention further comprises transmitting the high mean A, the low mean B and the bitmap for decoding.

The BTC method according to the embodiment of the present invention further comprises: (d) Finding the maximum value Xmax and the minimum value Xmin of the all pixels in a block, and calculating a mean difference D, wherein D=(A−B)/2; when the difference between the maximum value Xmax and the high mean A is larger than or equal to the difference between the low mean B and the minimum value Xmim (i.e.: (Xmax−A)>=(B−Xmin) ), a state value is made to be a first numerical value, a plurality of four-level decoding values is made to respectively be A+D, A, (A+B)/2, and B in numerical order, and the four-level decoding values are made to respectively correspond to a plurality of corresponding values ; and when the difference between the maximum value Xmax and the high mean A is less than the difference between the low mean B and the minimum value Xmim (ie: (Xmax−A)<(B−Xmin) ), the state value is made to be a second numerical value, the four-level decoding values are made to respectively be A, (A+B)/2, B and B−D in numerical order, and the four-level decoding values are made to respectively correspond to the corresponding values; and (e) determining which four-level decoding value the values of the pixels are most close to, and assigning a two-bit four-level corresponding value with the corresponding value corresponding to the closest four-level decoding value, the four-level corresponding bits of all the pixels constituting a four-level bitmap.

In the BTC method according to the embodiment of the present invention, in the step (e) of determining which four-level decoding value the values of the pixels are most close to comprises: calculating level quantization thresholds, wherein when the state value is the first numerical value, the four-level quantization thresholds are respectively B+5/2D, B+3/2D and B+1/2D in numerical order, and when the state value is the second numerical value, the four-level quantization thresholds are respectively B+3/2D, B+1/2D, and B−1/2D in numerical order; and comparing the values of the pixels with the level quantization thresholds, so as to determine best four-level decoding value.

The BTC method according to the embodiment of the present invention further comprises: transmitting the low mean B, the mean difference D, the state value and the four-level bitmap for decoding.

The present invention provides a BTC method, which comprises: (a) receiving an image input of a block comprising a plurality of pixels, and calculating a block mean X that is the average of all pixels value in a block; (b) classifying the pixels into a high intensity group and a low intensity group based on the block mean; (c) calculating the mean value of the pixels of the high intensity group: the high mean A, and the mean value of the pixels of the low intensity group: the low mean B; (d) seeking out a maximum value Xmax and a minimum value Xmin of the block pixels, and calculating a mean difference D, wherein D=(A−B)/2; when the difference between the maximum value Xmax and the high mean A is larger than or equal to the difference of the low mean B and the minimum value Xmim, a state value is made to be a first numerical value, a plurality of four-level decoding values is made to respectively be A+D, A, (A+B)/2, and B in numerical order, and the four-level decoding values are made to respectively correspond to a plurality of corresponding values ; and when the difference between the maximum value Xmax and the high mean A is less than the difference between the low mean B and the minimum value Xmim, the state value is made to be a second numerical value, the four-level decoding values are made to respectively be A, (A+B)/2, B and B−D, and the four-level decoding values are made to respectively correspond to the corresponding values; and (e) determining which four-level decoding value the values of the pixels are most close to, and assigning a two-bit four-level corresponding bit with the corresponding value corresponding to the nearest four-level decoding value, the four-level corresponding bits of all the pixels constituting a four-level bitmap.

In the BTC method according to the embodiment of the present invention, the step (e) of determining which four-level decoding value the values of the pixels are most close to comprises: calculating the level quantization thresholds, wherein when the state value is the first numerical value, the level quantization thresholds are respectively B+5/2D, B+3/2D and B+1/2D in numerical order, and when the state value is the second numerical value, the level quantization thresholds are respectively B+3/2D, B+1/2D, and B−1/2D; and comparing the values of the pixels with the level quantization thresholds, so as to determine the closest four-level decoding value.

The BTC method according to the embodiment of the present invention further comprises: transmitting the low mean B, the mean difference D, the state value and the four-level bitmap for decoding.

The present invention provides a BTC apparatus, which comprises: a block mean calculator, a bitmap assigning component with the stabilizing function and a high/low mean value calculator. The block mean calculator receives an image input of a block comprising a plurality of pixels, and calculates a mean value of the pixels X. The bitmap assigning component with the stabilizing function is coupled to the block mean calculator, and classifies the pixels into a high intensity group and a low intensity group based on the mean value of the pixels, and assigns a corresponding bit based on which group each of the pixels belongs to, and the corresponding bits of all the pixels constitute a bitmap, wherein the pixels or the corresponding bits are stabilized. The high/low mean value calculator is coupled to the bitmap assigning component with the stabilizing function, and calculates the mean value of the pixels of the high intensity group: the high mean A, and the mean value of the pixels of the low intensity group: the low mean B.

In the BTC apparatus according to an embodiment of the present invention, the bitmap assigning component with the stabilizing function further filters the pixels in the horizontal direction, in the vertical direction or between different frames, and assigns the corresponding bits based on the filtered result. Or, in the BTC apparatus according to another embodiment of the present invention, the bitmap assigning component with the stabilizing function further assigns the corresponding bits for the current frame with reference to the high mean A, the low mean B and the bitmap value of the plurality of frames before and after the current frame. Or, in the BTC apparatus according to still another embodiment of the present invention, the bitmap assigning component with the stabilizing function further adds a predetermined amplitude to the mean value of the pixels X to be used as a quantization threshold, and classifies the high intensity group and the low intensity group based on the quantization threshold. Moreover, in the BTC apparatus according to the embodiment of the present invention, the high/low mean value calculator further transmits the high mean A and the low mean B for decoding, and the bitmap assigning component with the stabilizing function further transmits the bitmap for decoding.

The BTC apparatus according to the embodiment of the present invention further comprises: a four-level expander and a four-level bitmap assigning component. The four-level expander is coupled to the high/low mean value calculator, and the four-level expander is used to seek out a maximum value Xmax and a minimum value Xmin of the pixels, and calculate a mean difference D, wherein $D=(A-B)/2$; when the difference between the maximum value Xmax and the high mean A is larger than or equal to the difference between the low mean B and the minimum value Xmim, a state value is made to be a first numerical value, a plurality of four-level decoding values is made to respectively be $A+D$, A, $(A+B)/2$, and B in numerical order, and the four-level decoding values are made to respectively correspond to a plurality of corresponding values; and when the difference between the maximum value Xmax and the high mean A is less than the difference between the low mean B and the minimum value Xmim, the state value is made to be a second numerical value, the four-level decoding values are made to respectively be A, $(A+B)/2$, B and $B-D$, and the four-level decoding values are made to respectively correspond to the corresponding values. The four-level bitmap assigning component is coupled to the four-level expander, determines the closest four-level decoding value, and assigns a four-level corresponding bit with the corresponding value corresponding to the closest four-level decoding value, and the four-level corresponding bits of all the pixels constitute a four-level bitmap.

In the BTC apparatus according to the embodiment of the present invention, the four-level bitmap assigning component calculates the level quantization thresholds, wherein when the state value is the first numerical value, the level quantization thresholds are respectively $B+5/2D$, $B+3/2D$ and $B+1/2D$ in numerical order, and when the state value is the second numerical value, the level quantization thresholds are respectively $B+3/2D$, $B+1/2D$, and $B-1/2D$, and compares the values of the pixels with the level quantization thresholds, so as to determine the closest four-level decoding value.

In the BTC apparatus according to the embodiment of the present invention, the four-level expander further transmits the low mean B, the mean difference D and the state value for decoding, and the four-level bitmap assigning component further transmits the four-level bitmap for decoding.

The present invention provides a BTC apparatus, which comprises: a block mean calculator, a bitmap assigning component, a high/low mean value calculator, a four-level expander and a four-level bitmap assigning component. The block mean calculator receives an image input of a block comprising a plurality of pixels, and calculates a block mean X. The bitmap assigning component is coupled to the block mean calculator, and classifies the pixels into a high intensity group and a low intensity group based on the block mean. The high/low mean value calculator is coupled to the bitmap assigning component, and calculates the high mean A, and the low mean B. The four-level expander is coupled to the high/low mean value calculator, and is used to seek out a maximum value Xmax and a minimum value Xmin of the pixels, and calculate a level difference D, wherein $D=(A-B)/2$; when the difference between the maximum value Xmax and the high mean A is larger than or equal to the difference between the low mean B and the minimum value Xmim, a state value is made to be a first numerical value, a plurality of four-level decoding values is made to respectively be $A+D$, A, $(A+B)/2$, and B in numerical order, and the four-level decoding values are made to respectively correspond to a plurality of corresponding values; and when the difference between the maximum value Xmax and the upper mean A is less than the difference between the low mean B and the minimum value Xmim, the state value is made to be a second numerical value, the four-level decoding values are made to respectively be A, $(A+B)/2$, B and $B-D$ in numerical, and the four-level decoding values are made to respectively correspond to the corresponding values. The four-level bitmap assigning component is coupled to the four-level expander, determines the closest four-level decoding value, and assigns a four-level corresponding bit with the corresponding value corresponding to the closest four-level decoding value, and the four-level corresponding bits of all the pixels constitute a four-level bitmap.

In the BTC apparatus according to the embodiment of the present invention, the four-level bitmap assigning component calculates a quantization threshold, wherein when the state value is the first numerical value, the quantization thresholds are respectively $B+5/2D$, $B+3/2D$ and $B+1/2D$ in numerical order, and when the state value is the second numerical value, the quantization thresholds are respectively $B+3/2D$, $B+1/2D$, and $B-1/2D$, and compares the values of the pixels with the quantization thresholds, so as to determine the closest four-level decoding value.

In the BTC apparatus according to the embodiment of the present invention, the four-level expander further transmits the low mean B, the mean difference D and the state value for decoding, and the four-level bitmap assigning component further transmits the four-level bitmap for decoding.

The present invention adopts the BTC method and apparatus thereof to include the additional stabilizing function to the pixel or the corresponding bit, or improves the conventional two-level BTC method and apparatus to the four-level BTC method and apparatus, thus reducing the interference of the noise, avoiding the flickers, and increasing the number of levels of the decoding value by low cost, thereby enhancing the image quality.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
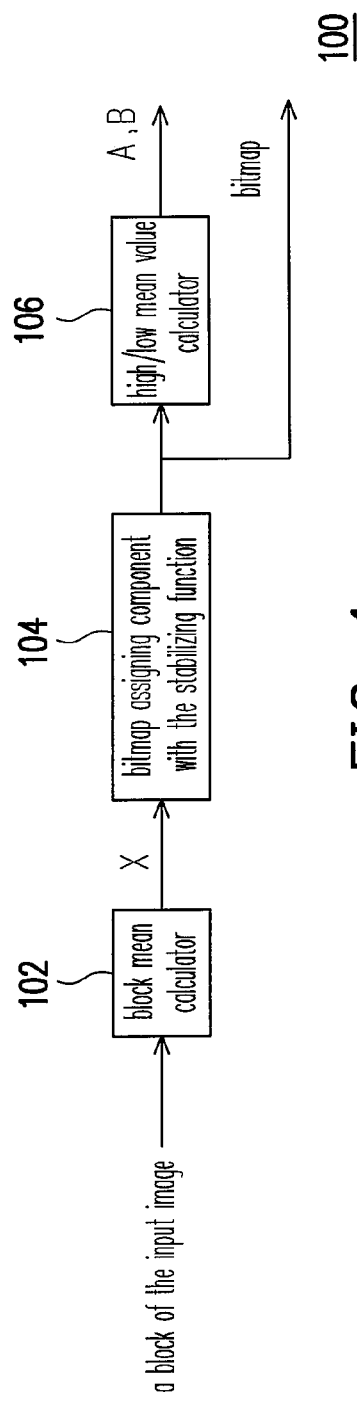
FIG. 1 is a block diagram of the BTC apparatus according to an exemplary embodiment of the present invention.

FIG. 1 is a block diagram of the BTC apparatus 100 according to an exemplary embodiment of the present invention. The apparatus 100 comprises a block mean calculator 102, a bitmap assigning component with the stabilizing function 104 and a high/low mean value calculator 106.

When the BTC is to be performed, first the whole image to be coded or compressed is divided to a plurality of blocks that are not overlapped, and each block comprises a plurality of pixels, for example, M×N pixels (horizontal M points and vertical N points). Then, the block mean calculator 102 of the present invention receives the pixels of the block, and calculates the block mean value X. The bitmap assigning component with the stabilizing function 104 is coupled to the block mean calculator 102, and classifies the pixels into a high intensity group and a low intensity group based on the block mean X, for example, the pixels larger than or equal to the block mean X belong to the high intensity group, and the pixels less than the block X belong to the low intensity group. The corresponding bit is assigned based on which group each pixel belongs to. For example, the corresponding bit of the pixels of the high intensity group is assigned to 1, and the corresponding bit of the pixels of the low intensity group is assigned to 0. The corresponding bits of all the pixels constitute a bitmap. The bitmap assigning component with the stabilizing function 104 stabilizes the pixels or the corresponding bits. For example, if the pixel has the noise with small amplitude and high frequency, the bitmap assigning component with the stabilizing function 104 performs a low-pass filtering in horizontal direction, or in vertical direction or between different frames, and assigns the corresponding bit based on the filtered result. Moreover, the bitmap assigning component with the stabilizing function 104 assigns the corresponding bit for the current frame with reference to the high mean A, the low mean B and the bitmap value of a plurality of frames before and after the current frame; or assigns the corresponding bit of the block for the current frame with reference to the corresponding bitmap of a plurality of frames before and after the current frame. The bitmap assigning component with the stabilizing function 104 may also add a predetermined amplitude to the block mean X to be used as a new quantization threshold, and may group the high intensity and the low intensity group based on the quantization threshold.

The block mentioned above is illustrated by an example block.

| 101 | 98 | 99 | 46 |
| 102 | 50 | 48 | 48 |

The block mean calculator 102 calculates that the mean value of the pixels X is 74. It is assumed that the noise amplitude is −4 and +6 after being measured or evaluated, we can add these values as our predetermined value to the block mean and the resulted quantization thresholds are 70 and 80. The bitmap assigning component with the stabilizing function 104 classifies the pixels with the value larger than 80 into the high intensity group, and classifies the pixels with the value less than 70 into the low intensity group. The pixels with the values between 70 and 80 maintain the corresponding bit value in the preceding frame. Accordingly, the bitmap assigning component with the stabilizing function 104 assigns the corresponding bit for each pixel, and the bitmap is:

| 1 | 1 | 1 | 0 |
| 1 | 0 | 0 | 0 |

The bitmap assigning component with the stabilizing function 104 transmits the bitmap for decoding.

The high/low mean value calculator 106 is coupled to the bitmap assigning component with the stabilizing function 104, and calculates the high mean A, and the low mean B. For the above block, the high/low mean value calculator 106 calculates that the high mean A is 100, and the low mean B is 48. The high/low mean value calculator 106 transmits the high mean A and the low mean B for decoding.

Figure 2:
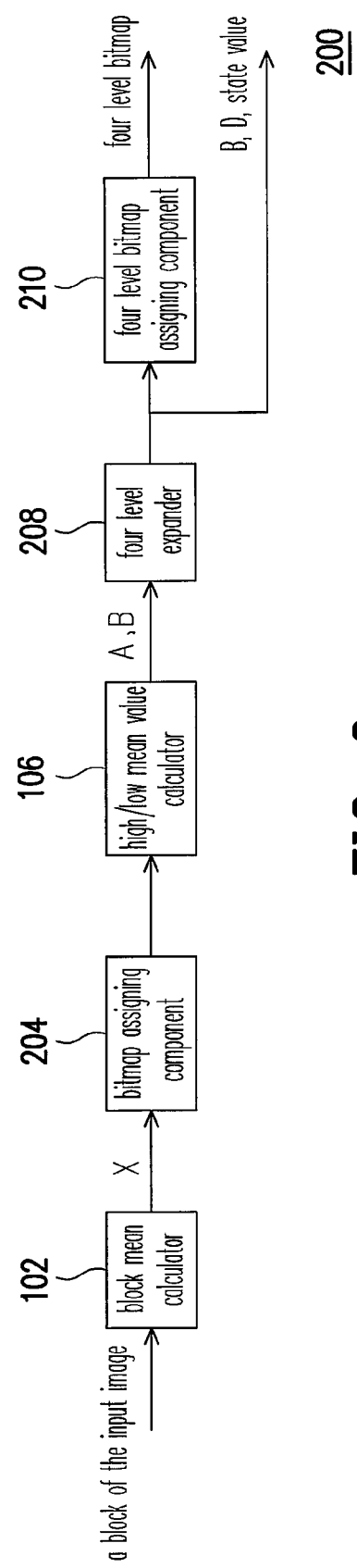
FIG. 2 is a block diagram of the BTC apparatus according to another exemplary embodiment of the present invention.

FIG. 2 is a block diagram of the BTC apparatus 200 according to another exemplary embodiment of the present invention. The apparatus comprises a block mean calculator 102, a bitmap assigning component 204, a high/low mean calculator 106, a four-level expander 208, and a four-level bitmap assigning component 210.

When the BTC is to be performed, first the image to be coded is divided to a plurality of blocks that are not overlapped. Then, the block mean calculator 102 receives the pixels in the block, definitely, the block comprises a plurality of pixels, and the block mean calculator 102 calculates the block mean X. The bitmap assigning component 204 is coupled to the block mean calculator 102, and classifies the pixels into a high intensity group and a low intensity group according to the block mean X. Here, the bitmap assigning component 204 may or may not assign the corresponding bit of each pixel. In an embodiment, the bitmap assigning component 204 may be the bitmap assigning component with the stabilizing function 104 in FIG. 1. The high/low mean value calculator 106 is coupled to the bitmap assigning component 204, and calculates the high mean A, and the low mean B.

Figure 3:
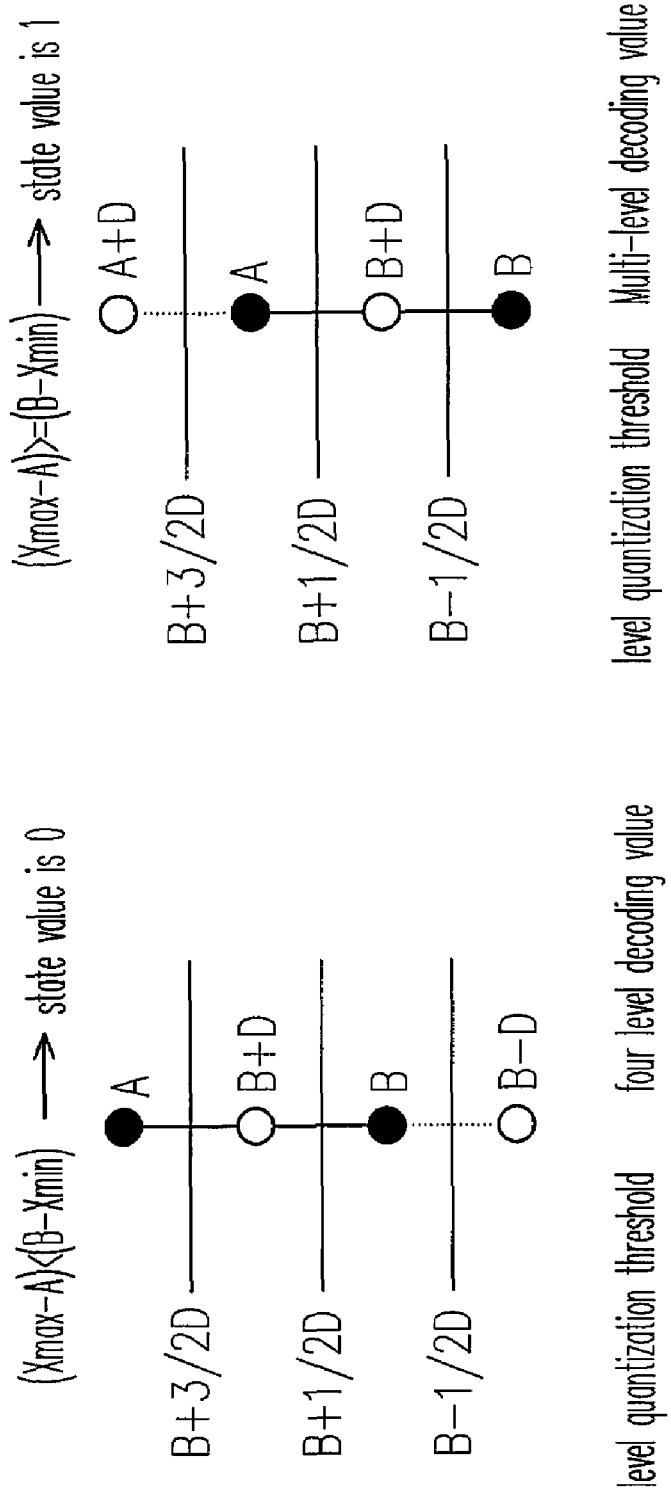
FIG. 3 is a schematic view of the state value, the corresponding four-level decoding value, and the quantization threshold of the BTC method according to an exemplary embodiment of the present invention.

The four-level expander 208 is coupled to the high/low mean value calculator 106. The four-level expander 208 finds out a maximum value Xmax and a minimum value Xmin of the pixels, and calculates a mean difference D, wherein D=(A−B)/2. Referring to FIG. 3, a schematic view of the state value, the corresponding four-level decoding value, and the quantization threshold of the BTC method according to an exemplary embodiment of the present invention is shown. When the difference between the maximum value Xmax and the high mean A is larger than the difference between the low mean B and the minimum value Xmim, a state value is made to be a first numerical value, a plurality of four-level decoding values is made to respectively be A+D, A, (A+B)/2, and B in numerical order, and the four-level decoding values are made to respectively correspond to a plurality of corresponding values. When the difference between the maximum value Xmax and the high mean A is less than the difference between the low mean B and the minimum value Xmim, the state value is made to be a second numerical value, the four-level decoding values are made to respectively be A, (A+B)/2, B and B−D, and the four-level decoding values are made to respectively correspond to the corresponding values. When the difference between the maximum value Xmax and the high mean A equals to the difference between the low mean B and the minimum value Xmim, the state value is assigned to be the first numerical value, or the second numerical value. The four-level expander 208 further transmits the low mean B, the level difference D and the state value for decoding.

The four-level bitmap assigning component 210 is coupled to the four-level expander 208. The four-level bitmap assigning component 210 determines the closest four-level decoding value and assigns a four-level corresponding bit with the corresponding value corresponding to the closest four-level decoding value, the four-level corresponding bits of all the pixels constitute a four-level bitmap. The step of determining the closest four-level decoding value comprises calculating a plurality of quantization thresholds, wherein when the state value is the first numerical value, the quantization thresholds are respectively B+5/2D, B+3/2D and B+1/2D, and when the state value is the second numerical value, the quantization thresholds are respectively B+3/2D, B+1/2D, and B−1/2D; and comparing the values of the pixels with the quantization thresholds, so as to determine the closest four-level decoding value. The four-level bitmap assigning component 210 further transmits the four-level bitmap for decoding. The corresponding values are respectively 11, 10, 01 and 00 and the first numerical value may be 1, the second numerical value may be 0.

An example block is used to illustrate the four-level coding:

| 104 | 76 | 52 | 38 |
|-----|----|----|----|
| 102 | 86 | 78 | 48 |

The block mean calculator 102 calculates that the mean value of the pixels in the block X which is 73. The bitmap assigning component 204 classifies the pixels with the value larger than 73 into the high intensity group, and classifies the pixels with the value less than 73 into the low intensity group. The high/low mean value calculator 106 calculates that the high mean A is 89, and the low mean B is 46. The four-level expander 208 seeks out that the maximum value of the pixel Xmax is 104 and the minimum value Xmin is 38, and calculates the level difference D=(89−46)/2=21. (Xmax−A)=25>(B−Xmin)=8, the state value is made to be 1. The four-level decoding values are respectively 111, 89, 68 and 46, and the four-level decoding values respectively correspond to 11, 10, 01 and 00. The four-level expander 208 further transmits the low mean B: 46, the mean difference D: 21 and the state value 1 for decoding. The four-level bitmap assigning component 210 calculates that the quantization thresholds are respectively 100, 79 and 57. The closest four-level decoding value is determined by comparing the pixel values to the quantization thresholds. Then, the four-level corresponding bit is assigned with the corresponding value corresponding to the closest four-level decoding value, and the obtained four-level bitmap is:

| 11 | 01 | 00 | 00 |
|----|----|----|----|
| 11 | 10 | 01 | 00 |

The four-level bitmap assigning component 210 further transmits the four-level bitmap. After decoding, the decoded block:

| 111 | 68 | 46 | 46 |
|-----|----|----|----|
| 111 | 89 | 68 | 46 |

It is known after calculation that no matter the maximum error value (two level: 15, four level: 10), or the root mean square error (two-level: 9.98, four-level: 7.13), the four-level expanding method can effectively reduce the error.

It is understood by those skilled in the art that the four-level expander 208 can transmit the high mean A, the mean difference D and the state value for decoding. The four-level expander 208 can also transmit the high mean A, the low mean B and the state value for decoding. The apparatuses of FIG. 1 and FIG. 2 may be integrated to combine both of their advantages.

Figure 4:
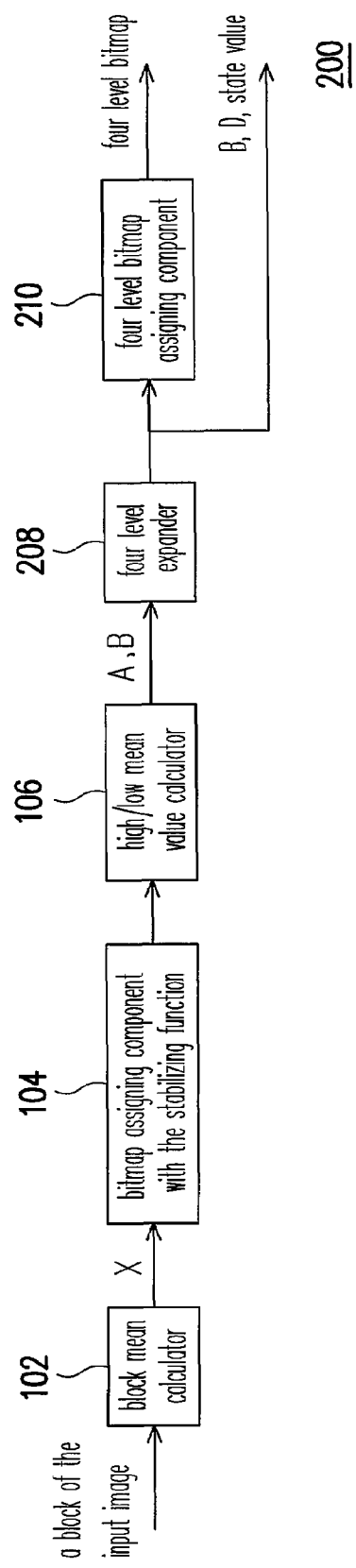
FIG. 4 is a block diagram of the BTC apparatus according to still another exemplary embodiment of the present invention.

Referring to FIG. 4, FIG. 4 is a block diagram of the BTC apparatus according to still another exemplary embodiment of the present invention. In the embodiment, each main component is basically the same as that of the apparatus of FIG. 2, but the bitmap assigning component 204 is replaced with the bitmap assigning component with the stabilizing function 104 in FIG. 1. Therefore, each component will not be described here. The apparatus of FIG. 4 is an exemplary embodiment of integrating the apparatuses of FIG. 1 and FIG. 2.

To sum up, in the BTC method and apparatus of the present invention, the stabilizing function for the pixel or the corresponding bit is added. In this manner, under the environment with noise, certain pixels close to the block mean will not be sometimes larger than the block mean, and sometimes less than the block mean at different frames due to the noise, such that at different frames, sometimes the pixels are decoded with the high mean A and the low mean B in other image frames. In this manner, the unpleasant flickers are avoided, which is particularly important for the equipments when processing a moving pictures sequence (e.g. for application to a display, camera or recorder). Alternatively, the present invention improves the conventional two-level BTC method and apparatus to the four-level BTC method and apparatus, thus reducing the distortion of coding and improving the image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A block truncation coding (BTC) method, used in an image coding device, wherein the image coding device comprising a block mean calculator, a bitmap assigning component and a mean calculator, the method comprising:

(a) receiving an image input of a block comprising a plurality of pixels, and calculating a block mean X by the block mean calculator;

(b) classifying the pixels into a high intensity group and a low intensity group based on the block mean, and assigning a corresponding bit based on which group each pixel belongs to by the bitmap assigning component, the corresponding bits of all the pixels constituting a bitmap, wherein the pixels or the corresponding bits are stabilized; and (c) calculating the mean value A of the pixels of the high intensity group (a high mean A), and the mean value B of the pixels of the low intensity group (a low mean B) by the mean calculator.

2. The BTC method as claimed in claim 1, wherein the step (b) comprises:

filtering the pixels in horizontal direction, or in vertical direction within a image frame or between different frames; and assigning the corresponding bits based on the filtered result.

3. The BTC method as claimed in claim 1, wherein the step (b) comprises:

assigning the corresponding bits for the block of the current frame with reference to the corresponding bitmap of a plurality of frames before and after the current frame.

4. The BTC method as claimed in claim 1, wherein the step (b) comprises: assigning the corresponding bits for the current frame with reference to the high mean A, the low mean B and the bitmap value of a plurality of frames before and after the current frame.

5. The BTC method as claimed in claim 1, wherein the step (b) comprises: adding a predetermined amplitude to the block mean X and use as a new quantization threshold, and classifying the high intensity group and the low intensity group based on the new quantization threshold.

6. The BTC method as claimed in claim 1, further comprising:

(d) seeking out a maximum value Xmax and a minimum value Xmin of the pixels, and calculating a mean difference D, wherein $D=(A-B)/2$;

when the difference between the maximum value Xmax and the high mean A is larger than or equal to the difference between the low mean B and the minimum value Xmim, a state value is made to be a first numerical value, a plurality of four-level decoding values is made to respectively be A+D, A, (A+B)/2, and B in numerical order, and the four-level decoding values are made to respectively correspond to a plurality of corresponding values; and when the difference between the maximum value Xmax and the high mean A is less than the difference between the low mean B and the minimum value Xmim, the state value is made to be a second numerical value, the four-level decoding values are made to respectively be A, (A+B)/2, B and B−D, and the four-level decoding values are made to respectively correspond to the corresponding values; and (e) determining the closest four-level decoding value, and assigning a four-level corresponding bit with the corresponding value corresponding to the closest four-level decoding value, the four-level corresponding bits of all the pixels constituting a four-level bitmap.

7. The BTC method as claimed in claim 6, wherein the step (e) of determining the closest four-level decoding value comprises:

calculating a plurality of quantization thresholds, wherein when the state value is the first numerical value, the quantization thresholds are respectively B+5/2D, B+3/2D and B+1/2D in numerical order, and when the state value is the second numerical value, the quantization thresholds are respectively B+3/2D, B+1/2D, and B−1/2D; and comparing the values of the pixels with the quantization thresholds, so as to determine the closest four-level decoding value.

8. The BTC method as claimed in claim 6, further comprising: transmitting the low mean B, the mean difference D, the state value and the four-level bitmap for decoding.

9. The BTC method as claimed in claim 6, wherein the corresponding values are respectively 11, 10, 01 and 00, and the first numerical value is 1, the second numerical value is 0.

10. The BTC method as claimed in claim 1, further comprising: transmitting the high mean A, the low mean B and the bitmap for decoding.

11. The BTC method as claimed in claim 1, wherein the corresponding bit of the pixels of the high intensity group is assigned to 1, and the corresponding bit of the pixels of the low intensity group is assigned to 0.

12. A block truncation coding (BTC) method, used in an image coding device, wherein the image coding device comprising a block mean calculator, a bitmap assigning component, a mean calculator, a four-level expander and a four-level bitmap assigning component, the method comprising:

(a) receiving an image input of a block comprising a plurality of pixels, and calculating a block mean value X by the block mean calculator;

(b) classifying the pixels into a high intensity group and a low intensity group based on the mean value of the pixels by the bitmap assigning component;

(c) calculating the mean value A of the pixels of the high intensity group (a high mean A), and the mean value B of the pixels of the low intensity group (a low mean B) by the mean calculator;

(d) seeking out a maximum value Xmax and a minimum value Xmin of the pixels, and calculating a mean difference D, wherein $D=(A-B)/2$ by the four-level expander;

when the difference between the maximum value Xmax and the high mean A is larger than or equal to the difference between the low mean B and the minimum value Xmim, a state value is made to be a first numerical value, a plurality of four-level decoding values is made to respectively be A+D, A, (A+B)/2, and B in numerical order, and the four-level decoding values are made to respectively correspond to a plurality of corresponding values; and when the difference between the maximum value Xmax and the high mean A is less than the difference between the low mean B and the minimum value Xmim, the state value is made to be a second numerical value, the four-level decoding values are made to respectively be A, (A+B)/2, B and B−D and the four-level decoding values are made to respectively correspond to the corresponding values; and (e) determining the closest four-level decoding value, and assigning a four-level corresponding bit with the corresponding value corresponding to the closest four-level decoding value by the four-level bitmap assigning component, the four-level corresponding bits of all the pixels constituting a four-level bitmap.

13. The BTC method as claimed in claim 12, wherein the step (e) of determining the closest four-level decoding value the values of the pixels are most close to comprises:
  calculating a plurality of quantization thresholds, wherein when the state value is the first numerical value, the quantization thresholds are respectively B+5/2D, B+3/2D and B+1/2D, and when the state value is the second numerical value, the quantization thresholds are respectively B+3/2D, B+1/2D, and B−1/2D; and
  comparing the values of the pixels with the quantization thresholds, so as to determine which the closest four-level decoding value.

14. The BTC method as claimed in claim 12, further comprising transmitting the low mean B, the mean difference D, the state value and the four-level bitmap for decoding.

15. The BTC method as claimed in claim 13, wherein the corresponding values are respectively 11, 10, 01 and 00, and the first numerical value is 1, the second numerical value is 0.

16. A block truncation coding (BTC) apparatus, comprising:
  a block mean calculator, for receiving an image input of a block comprising a plurality of pixels, and calculating a block mean of the pixels X;
  a bitmap assigning component with a stabilizing function, coupled to the block mean calculator, for classifying the pixels into a high intensity group and a low intensity group based on the block mean, and assigning a corresponding bit based on the group each pixel belongs to, the corresponding bits of all the pixels constituting a bitmap, wherein the pixels or the corresponding bits are stabilized; and
  a high/low mean calculator, coupled to the bitmap assigning component with the stabilizing function, for calculating the mean value A of the pixels of the high intensity group (a high mean A), and the mean value B of the pixels of the low intensity group (a low mean B).

17. The BTC apparatus as claimed in claim 16, wherein the bitmap assigning component with the stabilizing function further:
  filters the pixels in horizontal direction, or in vertical direction within an image frame or between different frames; and
  assigns the corresponding bits based on the filtered result.

18. The BTC apparatus as claimed in claim 16, wherein the bitmap assigning component with the stabilizing function further:
  assigns the corresponding bits for the current frame with reference to the high mean A, the low mean B and the bitmap value of a plurality of frames before and after the current frame.

19. The BTC apparatus as claimed in claim 16, wherein the bitmap assigning component with the stabilizing function further:
  adds a pre-determined value to the block mean X and uses as a new quantization threshold, and classifies the high intensity group and the low intensity group based on the new quantization threshold.

20. The BTC apparatus as claimed in claim 16, further comprising:
  a four-level expander, coupled to the high/low mean calculator, being used for:
    seeking out a maximum value Xmax and a minimum value Xmin of the pixels, and calculating a mean difference D, wherein D=(A−B)/2;
    when the difference between the maximum value Xmax and the high mean A is larger than or equal to the difference between the low mean B and the minimum value Xmim, a state value is made to be a first numerical value, a plurality of four-level decoding values is made to respectively be A+D, A, (A+B)/2, and B in numerical order, and the four-level decoding values are made to respectively correspond to a plurality of corresponding values; and
    when the difference between the maximum value Xmax and the high mean A is less than the difference between the low mean B and the minimum value Xmim, the state value is made to be a second numerical value, the four-level decoding values are made to respectively be A, (A+B)/2, B and B−D, and the four-level decoding values are made to respectively correspond to the corresponding values; and
  a four-level bitmap assigning component, coupled to the four-level expander, being used for:
    determining the closest four-level decoding value, and assigning a four-level corresponding bit with the corresponding value corresponding to the closest four-level decoding value, the four-level corresponding bits of all the pixels constituting a four-level bitmap.

21. The BTC apparatus as claimed in claim 20, wherein the four-level bitmap assigning component:
  calculates a plurality of quantization thresholds, wherein when the state value is the first numerical value, the quantization thresholds are respectively B+5/2D, B+3/2D and B+1/2D in numerical order, and when the state value is the second numerical value, the quantization thresholds are respectively B+3/2D, B+1/2D, and B−1/2D; and
  compares the values of the pixels with the quantization thresholds, so as to determine the closest four-level decoding value.

22. The BTC apparatus as claimed in claim 20, wherein the four-level expander further transmits the low mean B, the mean difference D and the state value for decoding.

23. The BTC apparatus as claimed in claim 21, wherein the four-level bitmap assigning component further transmits the four-level bitmap for decoding.

24. The BTC apparatus as claimed in claim 20, wherein the corresponding values are respectively 11, 10, 01 and 00, and the first numerical value is 1, the second numerical value is 0.

25. The BTC apparatus as claimed in claim 16, wherein the high/low mean value calculator further transmits the high mean A and the low mean B for decoding.

26. The BTC apparatus as claimed in claim 16, wherein the bitmap assigning component with the stabilizing function further transmits the bitmap for decoding.

27. The BTC apparatus as claimed in claim 16, wherein the corresponding bit of the pixels of the high intensity group is assigned to 1, and the corresponding bit of the pixels of the low intensity group is assigned to 0.

28. A block truncation coding (BTC) apparatus, comprising:
  a block mean calculator, for receiving an image input of a block comprising a plurality of pixels, and calculating a block mean of the pixels X;
  a bitmap assigning component, coupled to the block mean calculator, for classifying the pixels into a high intensity group and a low intensity group based on the block mean of the pixels;
  a high/low mean value calculator, coupled to the bitmap assigning component, for calculating the mean value A of the pixels of the high intensity group (a high mean A), and the mean value B of the pixels of the low intensity group (a low mean B);

a four-level expander, coupled to the high/low mean value calculator, and being used for:
seeking out a maximum value Xmax and a minimum value Xmin of the pixels, and calculating a mean difference D, wherein D=(A−B)/2;
when the difference between the maximum value Xmax and the high mean A is larger than or equal to the difference between the low mean B and the minimum value Xmim, a state value is made to be a first numerical value, a plurality of four-level decoding values is made to respectively be A+D, A, (A+B)/2, and B in numerical order, and the four-level decoding values are made to respectively correspond to a plurality of corresponding values; and
when the difference between the maximum value Xmax and the high mean A is less than the difference between the low mean B and the minimum value Xmim, the state value is made to be a second numerical value, the four-level decoding values are made to respectively be A, (A+B)/2, B and B−D, and the four-level decoding values are made to respectively correspond to the corresponding values; and
a four-level bitmap assigning component, coupled to the four-level expander, being used for:
determining the closest four-level decoding value, and assigning a four-level corresponding bit with the corresponding value corresponding to the closest four-level decoding value, the four-level corresponding bits of all the pixels constituting a four-level bitmap.

29. The BTC apparatus as claimed in claim 28, wherein the four-level bitmap assigning component:
calculates a plurality of quantization thresholds, wherein when the state value is the first numerical value, the quantization thresholds are respectively B+5/2D, B+3/2D and B+1/2D, and when the state value is the second numerical value, the quantization thresholds are respectively B+3/2D, B+1/2D, and B−1/2D; and
compares the values of the pixels with the quantization thresholds, so as to determine the closest four-level decoding value.

30. The BTC apparatus as claimed in claim 28, wherein the four-level expander further transmits the lower mean B, the mean difference D and the state value for decoding.

31. The BTC apparatus as claimed in claim 28, wherein the four-level bitmap assigning component further transmits the four-level bitmap for decoding.

32. The BTC apparatus as claimed in claim 28, wherein the corresponding values are respectively 11, 10, 01 and 00, and the first numerical value is 1, the second numerical value is 0.

* * * * *